United States Patent Office 2,707,906
Patented May 10, 1955

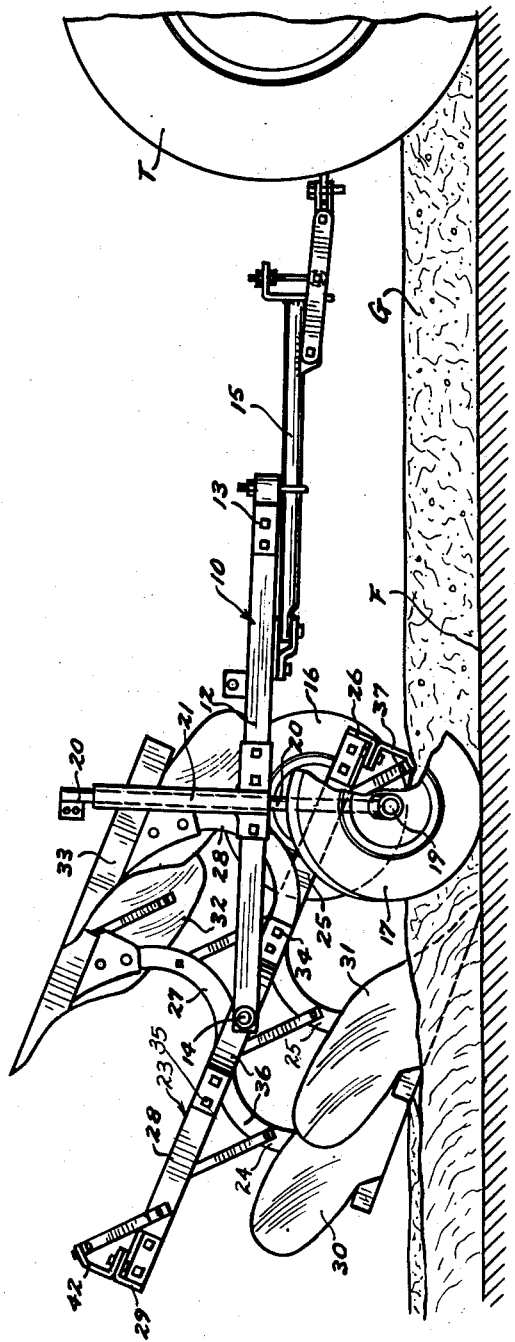

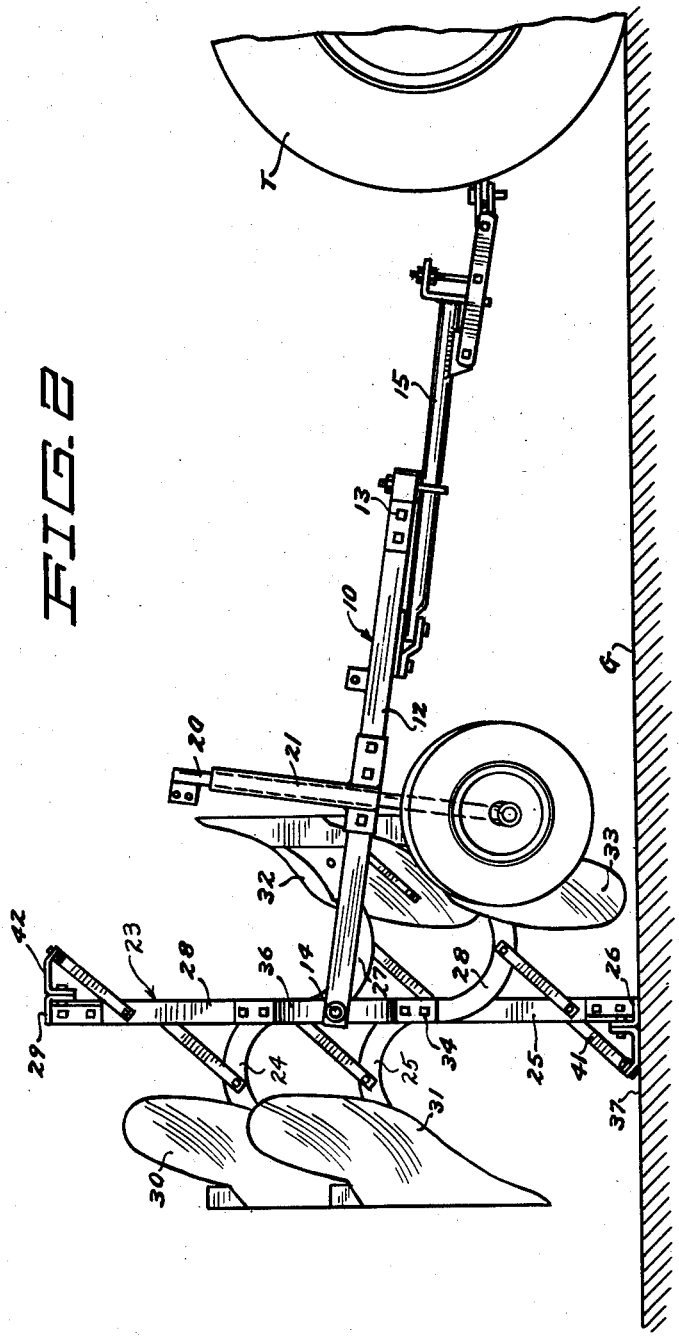

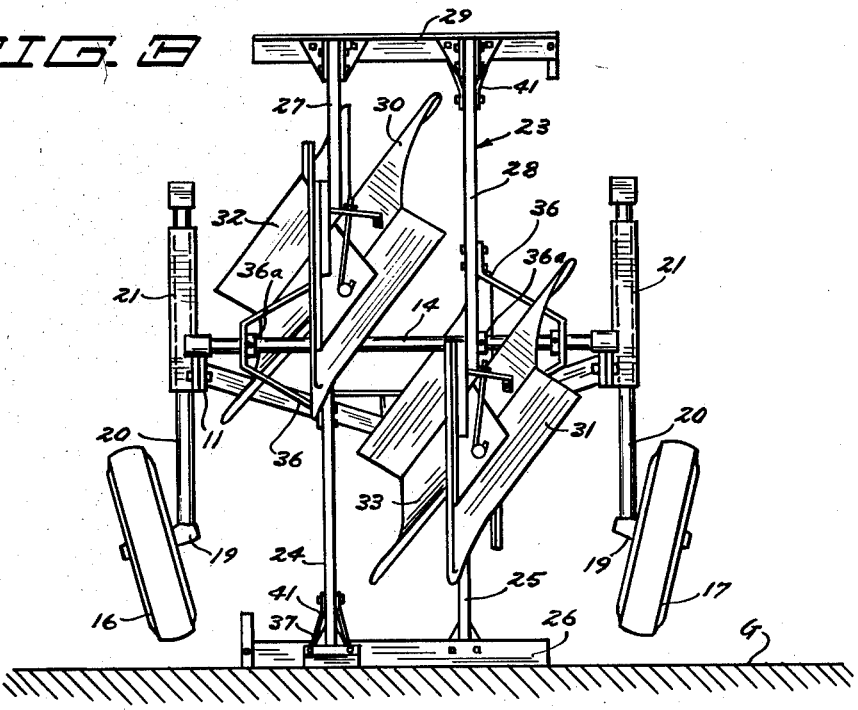
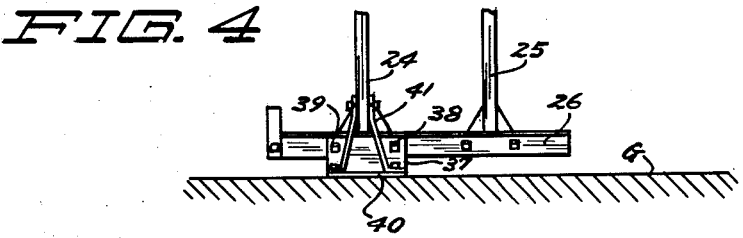
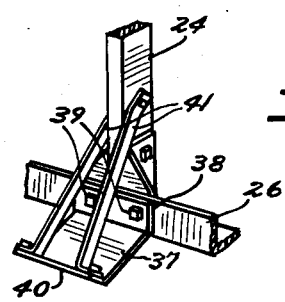

2,707,906

TURN-OVER PLOW STABILIZER

William E. Knapp, Moline, and Loren G. Arnold, Hillsdale, Ill., assignors to Minneapolis-Moline Company, Hopkins, Minn., a corporation of Minnesota Application August 21, 1953, Serial No. 375,687

4 Claims. (Cl. 97—24.5)

This invention relates generally to two-way reversible plows and more particularly to means for improving the reversing operation thereof.

Two-way reversible or turn-over plows are well known in the agricultural implement art and attention is directed to United States Patent No. 1,915,866 which discloses the construction and operation of such an implement. Our present invention is designed for use on and the improvement of the type of plow shown and described in that patent.

Conventionally, a two-way reversible plow comprises a wheeled main frame, adapted for connection to a draft implement, and a plow frame rotatably mounted thereon for turn-over or tumbling movement about an axis which is transverse with respect to the direction of travel. Right and left hand plow bottoms are mounted on the plow frame to be alternately brought into ground working position between turn-over movements of the frame. The plow frame also carries transversely disposed fore and aft cross beams adapted to alternately engage the ground surface and serve as a fulcrum for the turn-over or reversing movement of the frame between working positions. These beams are spaced sufficiently from the turning axis so as to cause the axis and the main frame to be raised relative to the ground during the turn-over to allow the main frame wheels to drop and become locked in a plow transporting position.

It has been found in the past that this type of plow tends to tilt or roll laterally during the turn-over. This is caused by the fact that when the plow frame is released for reversal the plow bottom, or front bottom if there be more than one, leaving the ground working position temporarily supports the weight of the plow upon the bottom point. Inasmuch as such point is necessarily located to one side of the center of weight of the plow, the raised frame structure tilts in the opposite direction or toward the landside of the supporting bottom. This lateral tilt or roll causes the forward cross beam to meet the ground surface at an angle throwing the weight of the plow entirely upon the landside of the beam. With the beam so engaging the ground it frequently sinks deeply thereinto and the main frame is not raised sufficiently to allow the ground wheels to lower to the desired transport position.

It is with this problem of lateral roll during the plow reversing operation that our invention is primarily concerned and the principal object of the invention is to provide a means for stabilizing the roll or tilt so that the cross beam might properly engage the ground surface to raise the frame and allow the ground wheels to drop into a transport position.

Another object of the invention is to provide a means whereby the frame structure will engage the ground surface for the plow turn-over operation sooner than is usually the case in the conventional turn-over plow construction.

Still another object of the invention is to provide a means for stabilizing the lateral roll, which necessarily occurs during the reversing operation of a turn-over plow, in an extremely simple manner and at a minimum expense.

With these and other objects in view our invention broadly comprises the mounting of a stabilizer shoe on each of the ground engaging cross beams at a place adjacent the landside end of the member, and said shoe projecting generally perpendicular to the plane of the rotatable frame and forwardly therefrom with respect to the direction of rotation. The leading edge of the shoe is angled upwardly for smooth engagement of the shoe with the ground.

The above mentioned and still additional objects of the invention will be brought to light during the course of the following specification reference being made to the accompanying drawings in which—

Fig. 1 is a side elevation showing the position of the plow shortly after it has been released for the turn-over movement.

Fig. 2 is also a side elevation but midway through the turn-over movement with the main frame raised to allow the ground wheels to drop into transport position.

Fig. 3 is a rear elevation of the implement in the same position as that shown in Fig. 2.

Fig. 4 is a fragmentary view of one end of the plow frame, showing the stabilizer shoe as it contacts the ground surface.

Fig. 5 is an enlarged perspective showing the stabilizer shoe and its mounting.

Referring now more particularly to the drawings reference characters will be used to denote like parts or structural features in the different figures. The main or draft frame of the plow is designated generally by the number 10 and includes a pair of transversely spaced side bars 11 and 12 integrally connected at their forward ends as at 13 and at their rear ends by a transverse shaft 14, which is round in cross section. A draft tongue 15 is mounted at the front of the frame and extends forwardly therefrom for connection to a draft implement such as the tractor T.

The frame 10 is mounted on ground wheels 16 and 17 for travel over the ground. Inasmuch as the wheel mountings at each side of the frame are identical only the mounting of the right wheel 17, which is foremost in Fig. 1, will be described. The wheel is mounted for rotation on a stub axle 19 which carries the wheel to incline slightly inwardly and downwardly (Fig. 3) so as to have a slight inward lead. The axle 19 has an elongated extension 20 which extends upwardly through a sleeve 21 mounted on the main frame. Extension 20 is longitudinally slidable in sleeve 21 for raising and lowering of the wheel 17 with respect to the frame. There is provided, however, a locking means (not shown) for automatically locking the extension 20 relative to the frame when the wheel is lowered to a transport position. The locking means may be of the type shown in the aforementioned patent or any other suitable releasable locking structure. However, inasmuch as the wheel locking means does not form a part of our invention we have not herein shown or described it. It is sufficient here to say that when the wheel is dropped to its lowermost position, such as will occur when the main frame 10 is raised relative to the ground, it will be automatically locked in such position until such time as the operator should desire to release the locking means and allow the wheel to again move upwardly relative to the frame.

We have mounted the plow frame, designated generally at 23, on the shaft 14 for rotation on the shaft in conventional manner. Frame 23 carries the right and left hand plow bodies and we have here shown two of each mounted thereon though, of course, more or less may be used as desired. The plow frame is made up primarily of the plow beams which directly support the plow bodies. When the plow is in such condition as to have the right hand plow bodies in ground working position, plow beams 24 and 25, which lie transversely spaced and parallel, extend forwardly from shaft 14 and have their forward ends rigidly connected by a cross beam or ground bar 26. This ground bar lies transversely with respect to the main frame and, while it extends endwise substantially beyond its connections with the respective beams 24 and 25, it is sufficiently limited in length to allow its passage downwardly between side members 11 and 12 of the main frame 10. Beams 27 and 28 extend longitudinally parallel and transversely spaced and are rigidly connected at their rear ends by a cross member or bar 29 which is identical to the member 26.

The beams 24 and 25 are curved downwardly at their rear ends and right hand plow bottoms 30 and 31 are fixed respectively thereto. Beam 24 is substantially longer than beam 25 and is journaled for rotation on the shaft 14 as shown. In the rearwardly extending set of beams 27 and 28 the forward ends thereof are bent upwardly and the beams respectively carry thereon left hand plow bottoms 32 and 33. In this set beam 28 is the longer and is journaled for rotation on shaft 14 in the same manner as the beam 24 so that both beams are rotatable about a common transverse axis and each is located inwardly substantially the same distance from the adjacent side bar 11 or 12 of the frame 10. The shorter beams 25 and 27 are not journaled directly on the shaft 14 but are respectively rigidly bolted at 34 and 35 to the beam 28 and 24 to move therewith as shown. Accordingly the beams 24, 25, 27 and 28 together with the cross bars 26 and 29 form a rigid plow frame rotatably mounted on the main frame 10. V-shaped braces 36 are mounted on each side of the plow frame to increase the rigidity thereof and are journaled on shaft 14 as shown. Collars 36a are secured on the shaft 14 by set screws and bear against the inner faces of the braces 36 to prevent sidewise movement of the plow frame on the shaft.

All of the heretofore described structure is conventional in two-way turn-over plow construction. The present invention lies in the structure for laterally stabilizing the plow during the rotation of the plow frame to change the plow bottoms supported in working relation to the ground. In describing this structure attention is directed particularly to Figs. 4 and 5 where the stabilizer shoe and its mounting are shown in detail. Identical shoes are mounted on each of the cross members or ground bars 26 and 29.

The shoe comprises a generally rectangular plate 37 having one marginal end portion 38 bent at right angles to the plane of the plate for attachment as by bolts 39 to bar 26 as shown. The opposite marginal end portion 40 is angled slightly upward from the plate and a pair of diagonal braces 41 rigidly connect said portion 40 to the beam 24 assuring rigidity of the plate relative to the bar 26. The shoe is mounted to extend forwardly from the member 26 relative to the direction of movement of the bar during the turn-over movement and lies on a plane which is substantially perpendicular to the plane of the plow frame in which the various plow beams lie.

A shoe 42, identical in structure and mounting to shoe 37 and is mounted on the ground bar 29, shown in Fig. 1 as being at the rear of the plow. This shoe is mounted on the right side of the longitudinal center line of the implement but otherwise in the same manner as shoe 37.

In conventional operation of a tumble type reversible plow the field is plowed in one direction with the right hand bottoms in ground working position and the right hand wheel riding in the next adjacent furrow F in the same manner as any one way tractor plow. When the end of the field is reached the wheels are lowered to transport position as the plow is turned over. The tractor and plow are then turned around and the field reentered and the plow tripped for further plowing operation. Now, however, the left wheel becomes the furrow wheel entering the furrow last made by the right hand bottoms and the left hand bottoms enter the ground for further plowing. In this manner all furrows in the field are turned the same direction.

Our present invention comes into play during the turnover operation. Assuming that right hand bottoms 30 and 31 are in working position, when the plow is tripped for reversal, bar 26 is released allowing rotation of frame 23 and the plow bottoms about the shaft 14. Accordingly, with continued forward movement after release of the plow frame, the draft on the plowing bottoms 30 and 31 will cause them to move rearwardly and upwardly out of the ground about the axis of shaft 14 swinging the forwardly disposed cross beam 26 downwardly and rearwardly into engagement with the ground. As this beam engages the ground it forms a fulcrum on which the plow frame 23 turns over. Inasmuch as the distance from shaft 14 to the cross bar 26 is greater than the distance from the main frame 10 to the ground when the plows are in working position, the plow frame raises the main frame relative to the wheels 16 and 17 as it turns. With axle extensions 20 slidable in sleeves 21, the ground wheels are gravitationally lowered with respect to the main frame. When the main frame has been raised sufficiently from the wheels the wheels are automatically locked in their lowered or transport position in any suitable manner such as described in the aforementioned Orelind patent. With wheels 16 and 17 in transport position the plow may be turned or otherwise maneuvered for return travel across the field.

As earlier discussed, it has been found that there is one common problem in successful performance of the turn-over operation. As the plow bottoms leaving the ground move rearwardly the weight of the plow comes to rest thereupon tending to roll the plow toward the landside. This is caused by the fact that the center of weight of the plow is to the landside of such bottom. This lateral roll of the plow causes the cross beam 26 or 29 moving toward the ground to engage the ground surface at an angle with the landside end of the bar meeting the ground surface first. If, when this occurs, the ground is of a relatively soft nature the beam will sink into the ground and the plow frame will not properly function to raise the main frame a sufficient distance to allow the wheels to drop into transport position.

By using the stabilizer plate 37 we have overcome the problem of lateral roll referred to. When the plate is used the turn-over operation is improved in two ways. First, inasmuch as the plate extends forwardly with respect to the direction of travel of the cross beam and from adjacent the landside end thereof, contact of the forward end of the plow frame with the ground is established much more quickly so as to prevent such lateral roll before it occurs. Secondly, the broad bearing surface which the plate presents to the ground prevents ground penetration by the landside end of the beam which bears the brunt of the weight during the turnover of the plow frame. Thus there is assured a firm engagement between the end bar and ground surface which prevents penetration of the bar and accordingly assures the dropping of the ground wheels to their transport position.

While the increased ground engaging area presented by the shoe is of great importance, the position of the shoe on the cross beam is particularly critical. When the right hand bottoms 30 and 31 are removed from the ground the plow will roll to the left and accordingly the shoe is mounted adjacent the left end of beam 26 which is the operative beam during that turn-over movement. Conversely, when the left hand bottoms 32 and 33 are being removed to swing beam 29 into the fulcrum position the plow will roll to the right and the shoe 42 is, accordingly, mounted adjacent the right end of member 29.

Braces 41 serve to strengthen the shoe against the buckling under the weight of the implement and the flanged forward edge 40 prevents the shoe from digging into the ground.

We have accordingly provided an improved plow construction which economically and effectively carries out the aforementioned objectives. It is understood that suitable modifications might be made in the structure as disclosed provided that such modifications come within the spirit and scope of the appended claims. Having now therefore fully illustrated and described our invention what we claim to be new and desire to protect by Letters Patent is:

1. In a two-way reversible plow, a main frame carrying ground wheels for travel over the ground, a plow frame pivoted to the main frame for turn-over movement about an axis transverse with respect to the direction of travel, oppositely acting plow bottoms mounted on the plow frame for presenting opposite types of bottoms alternately to the ground as said frame is turned over about said axis, opposite elongated narrow cross beams on the ends of the plow frame adapted to transversely engage the ground surface for raising the main frame as the plow frame is turned over, and a ground shoe on each of said beams which is wider than the beam for increasing the fore and aft area of contact between the beam and ground at the place of mounting, said shoe being mounted on each beam to the landside of the center of the beam with respect to the bottoms being removed from the ground by the turn-over movement.

2. In a two-way reversible plow, a main frame carrying ground wheels for travel over the ground, a plow frame pivoted to the main frame for upward, forward, downward, then rearward turn-over movement about an axis tansverse with respect to the direction of travel, oppositely acting plow bottoms mounted on the plow frame for presenting opposite types of bottoms alternately to the ground as said frame is turned over about said axis, opposite cross beams on the ends of the plow frame adapted to engage the ground surface for raising the main frame as the plow frame is turned over, and a ground shoe on each of said beams for increasing the area of contact between the beam and ground at the place of mounting, said shoe being mounted on each beam to the landside of the center of the beam with respect to the bottoms being removed from the ground by the turn-over movement, said shoe comprising a plate lying generally perpendicular to the common plane of said cross beams and extending forwardly from the beam with respect to the direction of movement of the beam about the turning axis of the plow frame for engagement of the ground by the plate prior to engagement by the beam as the beam moves downwardly and rearwardly toward the ground.

3. In a two-way reversible plow, a main frame carrying ground wheels for travel over the ground, a plow frame pivoted to the main frame for forward turn-over movement about an axis transverse with respect to the direction of travel, oppositely acting plow bottoms mounted on the plow frame for presenting opposite types of bottoms alternately to the ground as said frame is turned over about said axis, opposite cross beams on the ends of the plow frame adapted to engage the ground surface for raising the main frame as the plow frame is turned over, and a ground shoe on each of said beams for increasing the area of contact between the beam and ground at the place of mounting, said shoe being mounted on each beam to the landside of the center of the bar with respect to the bottoms being removed from the ground by the turn-over movement, said shoe comprising a plate lying generally perpendicular to the common plane of said cross beams and extending from the beam in a forward direction relative to the direction of movement of the beam about the axis, the leading edge of the shoe being angled upwardly from the plane of the shoe for smooth engagement of the shoe with the ground.

4. In a tractor plow a wheeled main frame for travel over the ground, a plow frame rotatably mounted on the main frame for forward turn-over movement about an axis transverse with respect to the direction of travel, a plow bottom mounted on the plow frame at one side of the axis and having its ground working point lying on one side of the longitudinal vertical center plane of the plow frame, a narrow cross beam on the plow frame extending parallel to said axis and on the opposite side of said axis from said plow bottom to transversely engage the ground during said turn-over movement, the distance from the axis to the beam being greater than the distance from the axis to the ground, and a ground contact device substantially wider than the beam mounted on the beam to lie entirely on the other side of said plane for increasing the fore and aft contact of the frame with the ground at the place of mounting during the turn-over movement.

References Cited in the file of this patent

UNITED STATES PATENTS

| | | |
|---|---|---|
| 1,770,569 | Chase et al. | July 15, 1930 |
| 1,915,866 | Orelind | June 27, 1933 |
| 2,188,413 | Markel | Jan. 30, 1940 |
| 2,440,166 | Bourne et al. | Apr. 20, 1948 |